Aug. 27, 1963   E. J. JOHNSTON   3,101,578
HAY CONDITIONING ROLLER MOUNTING
Filed Nov. 28, 1960
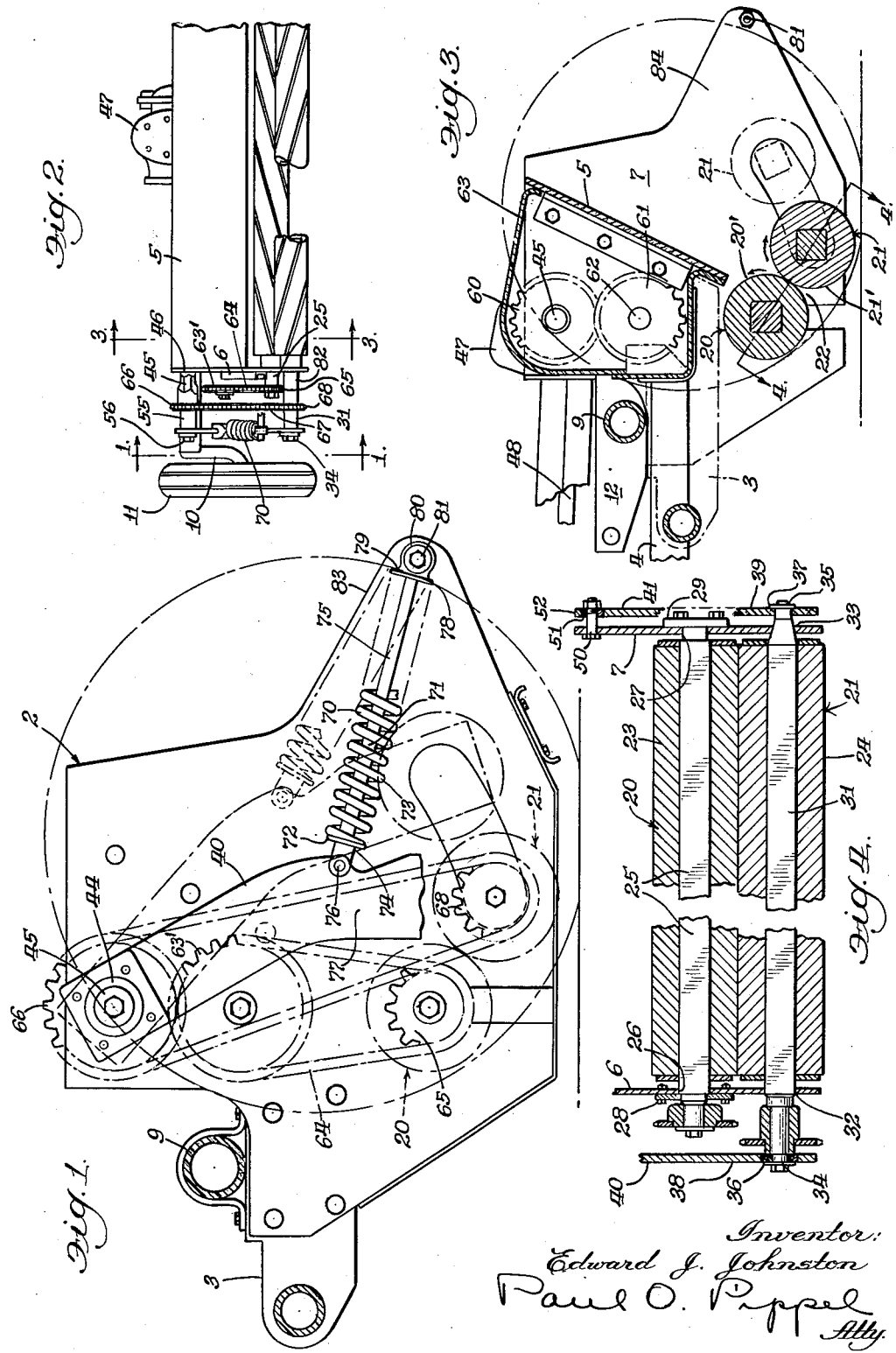
Inventor:
Edward J. Johnston
Paul O. Pippel
Atty.

3,101,578
HAY CONDITIONING ROLLER MOUNTING
Edward J. Johnston, La Grange Park, Ill., assignor to International Harvester Company, Chicago, Ill., a corporation of New Jersey
Filed Nov. 28, 1960, Ser. No. 71,990
9 Claims. (Cl. 56—1)

This invention relates to hay conditioners of the type which comprise a pair of superposed rolls between which hay and the like is adapted to be passed, the lower roll being adapted to pick the crops directly from the ground and more specifically the invention apertains to a novel mounting for the rolls.

In hay conditioners of the type under consideration, it is a common practice to mount the rolls in such a way that they provide a forwardly open bite which is adapted to receive the crops which are drawn between the rolls pursuant to rotation of the rolls. The construction presupposes an upper roll and a lower roll, and the lower roll is generally so constructed as to operate in close promixity to the ground. Inasmuch as the machine operates over an uneven terrain and there is frequent possibility of the machine striking large stones, boulders, stumps and the like, it is desirable to provide a mechanism for accommodating movement particularly of the lower roll to a position where it ca ride over the obstruction or swing back so that the initial impact will not so damage the machine as to require major repair and overhaul.

It is an object of the present invention to provide a novel mounting for the lower roll such that it is adapted to swing back rearwardly and upwardly away from an object which it may strike and presumably ride over such an object.

The invention contemplates a novel mechanism for automatically closing the rolls upon the resumption of normal operating conditions.

These and other objects and advantages inherent in and encompassed in the invention will become more readily apparent from the specification and the drawings wherein:

FIGURE 1 is a side-elevational view of the novel hay conditioner shown partially in section taken substantially on the line 1—1 of FIGURE 2;

FIGURE 2 is a fragmenary broken-apart rear-elevational view of the structure shown in FIGURE 1 shown on the smaller scale;

FIGURE 3 is a transverse vertical sectional view taken substantially on the line 3—3 of FIGURE 2, but on a larger scale; and FIGURE 4 is a sectional view taken substantially on line 4—4 of FIGURE 3.

*Description of the Invention*

Describing the invention in detail, and having particular reference to the drawings, the hay conditioner designated 2 comprises a frame structure generally indicated 3 by means of which it is attached to an associated tongue 4 fragmentarily shown in FIGURE 3 which is adapted to function as a towing member or a draft member to an associated towing vehicle such as the tractor (not shown). The frame structure includes a transverse framing 5 which may be of contoured sheet metal, or otherwise, and each end of the frame 5 comprises a pair of substantially vertical side sheets or plates 6 and 7 which afford side supports spaced transversely of the machine.

The frame structure 3 rotatably supports a transverse rockshaft 9 which projects outwardly of the side supports 6 and 7 at opposite ends and at each end supports a crank 10 which carries a supporting wheel 11, as will be readily understood by those skilled in the art. The rockshaft 9 is connected to an operating lever 12 which has a connection at 13 to an associated hydraulic device for rotating the shaft and thus rotating the cranks and elevating and lowering the unit as is adequately described in U.S. Patent 2,921,426.

The crushing or conditioning mechanism proper comprises upper and lower crushing rolls 20 and 21 which are arranged with the lower roll 21 operating in close proximity to the ground in direct picking relation thereto for picking cut crops such as hay and rotating in the direction shown by the arrow in FIGURE 3 to advance the material into the intake nip 22 which faces downwardly and forwardly inasmuch as the upper roll is disposed forwardly of the lower roll. The lower roll has its forward side 21' engaging the back side 20' of the upper roll 20 in the engaged position of the rolls. It will be understood that the bodies 23 and 24 of the upper and lower rolls 20 and 21 may be of any material and may be such as shown and claimed in the beforementioned patent.

The body 23 of the upper roll is mounted and retained on a center shaft 25 with which the body rotates, the shaft 25 extending through suitable apertures 26 and 27 in the side members 6 and 7 and carried on fixed bearing structures 28 and 29 mounted to the side supports 6 and 7. The roll 20 is supported substantially horizontally transverse to the direction of operation of the machine and generally parallel to the lower roll which has its body portion 24 suitably connected and constrained for rotation with the center shaft 31 which center shaft 31 extends at opposite ends through arcuate slots 32 and 33 in the support members 6 and 7 is adapted to move forwardly therein into engaged position of the rolls, as shown particularly in FIGURE 3, and into disengaged position of the rolls with the lower roll 21 swung rearwardly upon the lower roll striking an obstruction. It will be seen that the shaft 31 of the lower roll extends outwardly of the members 6 and 7 and its ends 34 and 35 is mounted in bearings 36 and 37 which are suitably supported at the lower ends 38 and 39 of the mounting arms 40 and 41 which are disposed outwardly respectively of the side support members 6 and 7.

The swing-back mounting for the lower roll, as constituted by the arms 40 and 41, permits its movement rearwardly, as heretofore explained, the said arms being journaled at their upper ends on a common axis, that is arm 40 being pivoted by means of a bearing structure 44 at its upper end on the input drive shaft 45 which is carried in a bearing 46 mounted on the side member 6, said shaft 45 extending to a gear box 47 which has a conventional gear train providing a right angle bend in the drive, the gear train in the gear box 47 being driven from the shafting 48 which extends forwardly over the tongue 4 of the unit and is adapted to be coupled to the power take-off of an associated tractor as well understood by those skilled in the art. The arm 41 is pivotally mounted on a stub shaft 50 by means of a bearing 51 at the upper end 52 of arm 41, the stub shaft 50 being suitably mounted on the side plate 7. The stub shaft 50 and the shaft 45 are coaxial.

It will be seen that the arm 40 is releasably retained through its bearing structure 55 on the shaft 45 by means of the cap screw 56 which is threaded into the shaft.

The drive to the upper roll is in the form of a gearing 60 which comprises a spur gear connected to the shaft 45 and meshing with a companion gear 51 on the countershaft 62 suitably mounted in an enclosure structure or housing 63, the shaft 62 projecting outwardly of the side 6 of the crushing unit and mounting a sprocket 63' which drives the chain 64 which, in turn, drives a sprocket 65 which is suitably connected, preferably as by bolting, to the shaft 25 of the upper roll. The drive to the lower roll proceeds from a sprocket 66 mounted to the shaft 46, a chain 67, which in turn drives a sprocket 68 which is mounted and connected to the shaft 31 of the lower roll.

It will be noted that the drive for the lower roll is coaxial with this swinging axis of the support and loading arms 40 and 41, and that these arms 40 and 41 are continuously biased to engaged position of the lower roll by a spring assembly or biasing means 70 which fits over a telescoping guide or holder 71 which has a seat 72 at one end affording a seat for the adjacent end of the compression spring 73. The holder element 71 telescopes with the holder element 75 axially of the spring, the former having its outer end 76 pivoted to an intermediate rearwardly projecting intermediate portion 77 of the associated arm. It will be seen that the other end of the spring 70 seats as at 78 against a seat 79 formed at the outer end of the member 75, said member 75 having an ear 80 which is pivoted as at 81 to a stub shaft or mounting element 82 which is connected and extends transversely outwardly from a rearwardly projecting mounting bracket portion 83 or 84 of the associated side member 6 or 7. Thus, it will be noted that the axis of pivot of the arms at their upper ends, the axis of pivotal connection of the arms to the respective spring-biasing assemblies and the axis of pivot of the biasing assembly to the associated side support are arranged in a triangular arrangement and that upon swingback the tendency is for the three points to approach a straight line; however, they are always below the straight line, and therefore, upon release of the load tending to swing back the lower roll away from the upper roll, the mechanism is actuated by reaction of the biasing means 70 to move the assembly downwardly and forwardly, into engaged position of the lower roll.

Thus, it will be readily appreciated that a novel and effective arrangement has been provided for alleviating the possibility of serious damage to the rolls, the lower roll unit being adapted to swing rearwardly upon the occurrence of any destructive condition.

It will be understood that various other forms of the invention will become readily apparent to those skilled in the art and that the foregoing description and exemplary disclosure has been for the purpose of clearly and concisely teaching the aspects of the present invention and that same is not intended by way of limitation, but that other forms of the invention will become readily apparent within the scope of the appended claims.

I claim:

1. In an ambulatory field operatnig crop treating apparatus, a support, the combination of a plurality of cooperatively arranged upper and lower parallel rollers having generally horizontal axis, means fixedly rotatably mounting the upper of said rollers from the support, and means swingably mounting the lower of said rollers in trailing relation to the upper of said rollers for movement about an axis generally parallel to said upper of said rollers forwardly to an operative position of the rollers and rearwardly and upwardly to an inoperative position the axis of said means being disposed above and forwardly of the axis of said lower roll.

2. In a field implement, the combination of a frame including a pair of transversely spaced supports, upper and lower rolls extending therebetween, and means movably carrying the lower roll from the frame for bodily movement rearwardly upon striking an obstruction, said rolls having a superposed relation with each other in the operative position thereof, said lower roll positioned to pick ground borne crops directly from a field, and means yieldably reacting between the frame and said lower roll urging the latter toward the upper roll.

3. In an implement for treating field borne crops, an ambulatory support, upper and lower cooperatively arranged rolls, said lower roll positioned in trailing relation to the upper roll to operate close to the ground, and means mounting said rolls from the support and including means movably mounting the lower roll for movement rearwardly with respect to the upper roll upon said lower roll striking an obstruction.

4. In an implement for field treating crops, an ambulatory structure including a pair of transversely spaced-apart supports, an upper and a lower roll disposed in cooperative relation and extending between the supports, the lower roll positioned for picking the crops from the field and entering them between the rolls pursuant to rotation of the rolls, means rotatably mounting said upper roll on a transverse axis, arm means adjacent to respective supports having lower ends rotatably mounting opposite ends of the lower roll and having upper ends pivotally mounted from the structure on an axis generally parallel to that of the rolls and yieldable means biasing said arms to a position releasably urging the lower roll toward the upper roll, said lower roll being disposed rearwardly of the upper roll.

5. In a crop treating apparatus comprising an ambulatory support, upper and lower cooperatively arranged rolls, upper roll rotatably carried by the support, said upper roll having a forwardly facing front side and a rearwardy facing rear side, transversely spaced arm means having common ends coaxially pivotally suspended from the support and having other ends rotatably supporting said lower roll, said lower roll swingable on an arc intersecting said upper roll and having an operative position with the rear side of the upper roll and swingable rearwardly away from the upper roll to inoperative position.

6. In a hay conditioner, a frame including a pair of laterally spaced side members, upper and lower rolls between said side members, said upper roll rotatably mounted on the side members, said side members having transversely aligned elongated slots, and means movably mounting the lower roll through the slots for movement forwardly and rearwardly into operative and inoperative position with respect to the upper roll.

7. In a hay conditioner, a frame, a pair of laterally spaced support members, upper and lower cooperatively arranged rolls extending therebetween, means rotatably mounting the upper roll from the frame, and guide means rotatably and movably mounting the lower roll for movement upwardly and rearwardly with respect to the upper roll upon the lower roll striking an obstruction or the like, said guide means comprising a pair of elements disposed respectively along respective support members, means pivotally connecting one of the corresponding ends of said elements coaxially to respective support members, said members coaxially rotatably mounting said lower rollers at their other ends, said members having angularly related portions joined in an elbow and spring means reacting between the elbow and the frame at points spaced radially of the rolls.

8. In a crop treating device, an ambulatory support including a pair of laterally spaced side members, an upper roll extending between said members and rotatably supported therefrom and having a center shaft, a lower roll cooperatively associated with the upper roll and having a center shaft having ends extending outwardly through arcuate slots in the side members, arms disposed respectively outwardly of said members and having lower ends rotatably mounting respective ends of the center shaft of the lower roll, a drive shaft above the upper roll rotatably supported from the support generally parallel to said shafts, means pivotally mounting the upper ends of the arms on an axis coincidental with drive shaft, chain and sprocket drive means between at least one end of the drive shaft and an end of center shaft of the lower roll, spring biasing means connected to each arm intermediate its ends and extending rearwardly therefrom and reactively mounted against respective members.

9. In a hay conditioner, a support having a pair of said members, upper and lower crushing rolls cooperatively arranged upon the support between said side members, means mounting the lower roll for operation close to the ground and for movement rearwardly out of the path of an obstruction upon said lower roll striking such obstruction, and comprising guiding and supporting means connected to the respective side members and to the lower roller, and yieldable biasing means connected between the support and said guiding and supporting means in a toggle arrangement.

References Cited in the file of this patent

UNITED STATES PATENTS

| | | |
|---|---|---|
| 2,918,774 | McCarty | Dec. 29, 1959 |
| 2,989,830 | Pristo | June 27, 1961 |